(12) United States Patent
Sigel et al.

(10) Patent No.: US 6,569,500 B1
(45) Date of Patent: May 27, 2003

(54) METHOD FOR CONTROLLING GLOSS LEVEL

(75) Inventors: Gary A. Sigel, Lancaster, PA (US); Clifford M. Rosenau, Willow Street, PA (US); Craig W. DeSantis, Lititz, PA (US); F. Joseph Appleyard, East Petersburg, PA (US)

(73) Assignee: AWI Licensing Company, Wilmington, DE (US)

( * ) Notice: Subject to any disclaimer, the term of this patent is extended or adjusted under 35 U.S.C. 154(b) by 44 days.

(21) Appl. No.: 09/639,131

(22) Filed: Aug. 15, 2000

Related U.S. Application Data

(62) Division of application No. 09/363,902, filed on Jul. 28, 1999, now Pat. No. 6,333,076.

(51) Int. Cl.[7] .................................................. C08J 7/04
(52) U.S. Cl. ........................ 427/494; 427/553; 427/558
(58) Field of Search .................. 427/487, 429, 427/493, 494, 508, 512, 520, 553, 558, 595

(56) References Cited

U.S. PATENT DOCUMENTS

| | | | |
|---|---|---|---|
| 3,658,620 A | 4/1972 | Hall | 156/272 |
| 3,785,850 A | 1/1974 | Parker | 117/93.31 |
| 3,924,023 A | 12/1975 | Boranian et al. | 427/54 |
| 4,100,318 A | 7/1978 | McCann et al. | 428/159 |
| 4,113,894 A | 9/1978 | Koch, II | 427/44 |
| 4,138,299 A | 2/1979 | Bolgiano | 204/159.16 |
| 4,169,167 A | 9/1979 | McDowell | 427/54 |
| 4,170,663 A | 10/1979 | Hahn et al. | 427/44 |
| 4,210,693 A | 7/1980 | Regan et al. | 428/152 |
| 4,289,798 A | 9/1981 | Bagley et al. | 427/39 |
| 4,303,695 A | 12/1981 | McCann et al. | 427/44 |
| 4,309,452 A | 1/1982 | Sachs | 427/44 |
| 4,313,969 A | 2/1982 | Matthews et al. | 427/44 |

(List continued on next page.)

FOREIGN PATENT DOCUMENTS

| | | | |
|---|---|---|---|
| CA | 1127022 | 7/1982 | 117/126 |
| EP | 0494658 A2 | 1/1992 | B24D/3/28 |
| GB | 2020998 A | 5/1979 | B32B/27/30 |
| GB | 2182337 A | 10/1986 | C08L/61/28 |
| GB | 2310815 A | 3/1997 | B32B/27/08 |
| JP | 2-105470 | of 1992 | |
| WO | WO 93/05227 | 9/1992 | D06N/3/08 |

OTHER PUBLICATIONS

Advertisement from Energy Sciences, Inc. entitled "Electron Beam Basics" (1995).

(List continued on next page.)

*Primary Examiner*—Michael Barr
*Assistant Examiner*—Rebecca A. Blanton
(74) *Attorney, Agent, or Firm*—Womble Carlyle Sandridge & Rice, PLLC

(57) ABSTRACT

The invention is a method for manufacturing a surface covering product having a gloss controlled surface wear-layer coating and a curable composition used in that method. The preferred curable composition is a polymerizable coating which includes a di-isocyanate and/or isocyanurate structure, a polyester polyol, a hydroxy and acrylyl functional polyester, mono, di, or tri-functional acrylates, and a flatting agent and/or hard particulates. The preferred surface covering product is a floor covering product produced as a vinyl film that is precoated with preferably a wearlayer coating that is adhered to the vinyl film, and the surface of the film is preferably embossed. A gloss controlled surface coating is achieved by application of the preferred composition to the printed sheet of film, and the composition is then exposed to low intensity ultraviolet light followed by exposure to ionizing radiation from a low accelerating energy electron beam, which forms an abrasion resistant wearlayer with non-visible degradation of the printed film.

7 Claims, 3 Drawing Sheets

U.S. PATENT DOCUMENTS

| | | |
|---|---|---|
| 4,393,187 A | 7/1983 | Boba et al. ................... 528/60 |
| 4,395,452 A | 7/1983 | Scher et al. ................ 428/148 |
| 4,405,657 A | 9/1983 | Miller, Jr. et al. ......... 427/54.1 |
| 4,411,931 A * | 10/1983 | Duong ...................... 427/492 |
| 4,418,109 A | 11/1983 | Miller, Jr. et al. .......... 428/142 |
| 4,421,782 A | 12/1983 | Bolgiano et al. .......... 427/53.1 |
| 4,491,616 A | 1/1985 | Schmidle et al. ........... 428/158 |
| 4,508,750 A | 4/1985 | Föll et al. ..................... 427/44 |
| 4,781,987 A | 11/1988 | Bolgiano et al. ........ 428/424.6 |
| 4,880,689 A | 11/1989 | Park et al. .................. 428/143 |
| 4,971,855 A | 11/1990 | Lex et al. ................... 428/206 |
| 5,003,026 A | 3/1991 | Ehrhart et al. ................ 528/49 |
| 5,401,560 A | 3/1995 | Williams .................... 428/143 |
| 5,545,476 A | 8/1996 | O'Dell et al. ............... 428/327 |
| 5,585,415 A | 12/1996 | Gorzalski et al. ............. 522/18 |
| 5,719,227 A | 2/1998 | Rosenberry et al. ........ 524/590 |

OTHER PUBLICATIONS

Advertisement from Radtech International North America entitled "It's Quite Possible That You've Never Seen Light Used So Many Ways Before." (1995).

Advertisement from Energy Sciences, Inc. entitled "Safe Processing with Electrocure™ Electron Beam Curing Systems" (1995).

Official Patent Abstract of Japanese Application No. 02105470.

Patent Abstract Japanese Application No. 105470, Derwent Publications Ltd. (1992).

* cited by examiner

METHOD FOR CONTROLLING GLOSS LEVEL

CROSS-REFERENCE TO RELATED APPLICATION

The present application is a division of U.S. pat. application Ser. No. 09/363,902, filed Jul. 28, 1999. Now U.S. Pat. No. 6,333,076.

BACKGROUND OF THE INVENTION

1. Field of the Invention

The present invention is generally directed to a surface covering product. More specifically, the present invention is directed to a floor covering product having a precoated film wearlayer in which the gloss level of the coating is controlled.

2. Description of the Related Art

Surface covering products, such as floor tiles and floor covering sheets, are well known in the art. The "gloss," or shine, of the floor covering product is commercially significant since differing gloss levels in floor covering products are desired by the consumer. Accordingly, it is known that gloss control can be accomplished through various processes, including by altering the specific coating composition for the amount of gloss desired on the end product, and by controlling the curing of the coating.

A floor covering sheet is frequently manufactured on a belt or drum line, where a substrate is laminated with a transparent covering, or "wearlayer," such that the end product can withstand foot traffic. The wearlayer may be embossed, and if embossed the embossing is done simultaneously with or after the lamination. The wearlayer can be a coated or uncoated film such as a rigid film comprised of polyvinyl chloride (PVC), polyethyleneterephthalate (PET), or glycolated polyethyleneterephthalate (PETG). "Rigid film" is a term of art which means any film that is substantially free of plasticizers, e.g. phthalate esters, thereby imparting resistance of the polymer to deform. Other floor products are coated or covered with the wearlayer, which is typically comprised of a curable composition, such as acrylated urethane or acrylated polyethylene, and is coated in liquid or flowable form onto a vinyl or nonvinyl composition substrate. The wearlayer typically is then cured to form the durable covering to withstand repeated contact in use.

U.S. Pat. No. 4,313,969 to Matthews shows a prior method and apparatus for providing low gloss and gloss controlled radiation cured coating. Matthews discloses a filtered mercury bulb to control spectral distributions. Thus, the gloss control is particularly achieved by varying spectral distribution in curing the coating, and Matthews generally describes gloss control therefrom.

It also is known to cure the wearlayer by controlled exposure to ultraviolet radiation from commercially available mercury lamps. The mercury lamps, however, have a significant infrared component, which conveys excess heat to the curing substrate. If the wearlayer is coated on a rigid vinyl film and cured, excess heat causes a problem when the glass transition temperature of the vinyl film is exceeded. The excess heat causes distortion of the film and results in an unaesthetic appearance of the resultant floor covering product.

SUMMARY OF THE INVENTION

The present invention is a composition and method for manufacturing a surface covering, particularly a covering product, comprised of a controlled gloss composition that is coated on a rigid film to form a wearlayer. The coated rigid film is prepared by the use of low intensity UV energy followed by exposure to low energy electron beam radiation that is controlled to avoid yellowing the decorative rigid film by degradation processes commonly observed for PVC film. The preferred composition contains a conventional flatting agent to lower gloss, and also contains hard inorganic particulates, such as aluminum oxide particles, to improve abrasion resistance of the exposed surface of the wearlayer. The composite structure is laminated to a substrate under known process conditions that preferably result in an aesthetically acceptable floor covering.

In the preferred process of making the surface covering, the low gloss wearlayer composition is formed by the reaction of a hydroxyterminated polyester with an isocyanurate in the presence of multifunctional acrylates and hard particles. Partial polymerization is catalyzed by low intensity UV radiation to gel (i.e. partially cure) the wearlayer surface to form a low gloss coating. The final polymerization is catalyzed either from exposure to low energy electron beam radiation or to high intensity UV radiation. Alternatively, a cured coated decorative film is laminated to a substrate, which may be cut to form a floor tile product of desired dimensions.

Therefore, it is an object of the present invention to provide a process of selectively producing either a high, medium and/or low gloss floor coating from the same composition which is coated on a substrate. The present invention also includes the various products produced by this process. In the preferred embodiment, gloss levels can be controlled by varying UV radiation intensity. The intensity of the initial UV exposure can be changed by various known means, including but not limited to varying the distance between the lamp head and substrate and/or by changing input power of the source.

It is a further object of the present invention to provide a flexible process to prepare variable gloss level wearlayers on PVC film. In the preferred embodiment, the acrylated urethane coating is partially cured to a 'gel state' using low intensity UV radiation while the film is in contact with a temperature controlled drum. Using this process, the low intensity UV radiation does not cause distortion of the PVC film by shrinkage processes commonly observed when PVC film is exposed to heat above its distortion temperature.

It is a further object of the present invention to provide a process to prepare high, medium and low gloss floor wearlayer surfaces from the Uv-cured coating compositions on the surface covering product. For example, UV-cured resin materials having a high viscosity typically will not form a low gloss surface upon exposure to UV, due to a lack of mobility of the flatting agent to the surface. Thus, in the preferred embodiment, the viscosity of the resin material is controlled prior to 'partial gelation' by use of a heated drum. Gloss control further can be achieved by varying the temperature of the drum prior to initial exposure to UV radiation.

Other objects, features and advantages will become apparent after review of the hereinafter set forth Brief Description of the Drawings, Detailed Description of the Invention and Claims appended herewith.

DETAILED DESCRIPTION OF THE INVENTION

Figure 1:
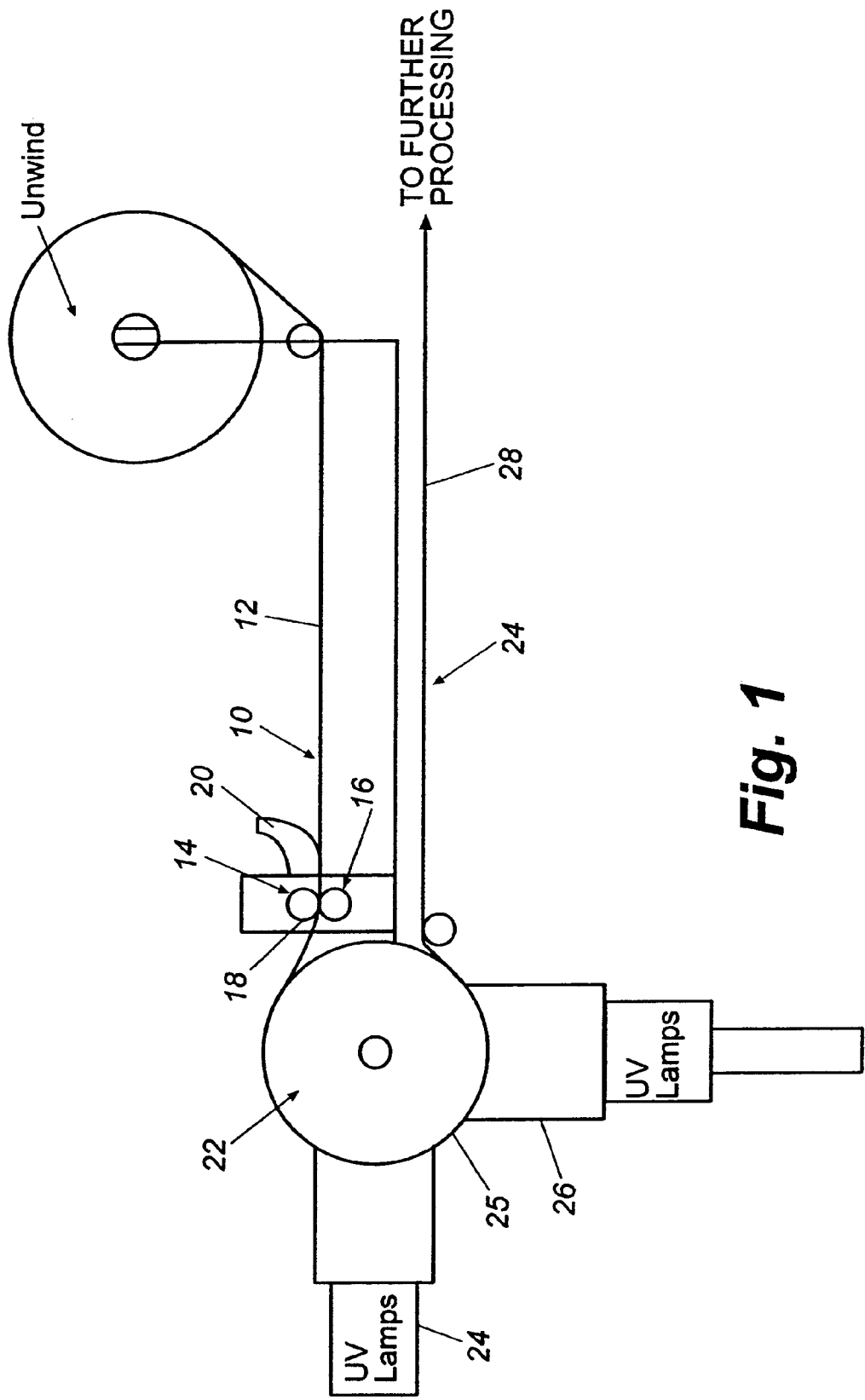
FIG. 1 is a schematic view of a two roll coater performing the preferred process to produce matte-coated rigid vinyl film.

Referring now in greater detail to the drawings in which like numerals represent like components throughout the several views, in FIG. 1 rigid film 10 having a decorative layer on one surface is fed into a coater such that the surface to be coated is preferably the non decorative surface 12. The method of coating preferably is by a wire wound rod, three roll coater or a dead two roll coater. The coating application is shown in FIG. 1 as being performed on a dead roll coater. The coater geometry consists of two heated non-moving rolls 14 and 16. The space or nip 18 between the two heated rolls 14 and 16 is kept at a distance that approximately equals the rigid film thickness plus desired coating thickness. The film 10 is routed through the space 18 between the two rolls 14 and 16 in a manner that allows the non-decorative side 12 of the rigid film 10 to be coated. Two endcaps 20 are part of a reservoir to retain the coating in the nip. The temperature of the rolls is kept below the glass transition temperature of rigid vinyl film, typically 140° F., but warm enough to maintain the resin viscosity to allow for improved flow characteristics to eliminate coating defects commonly observed for high viscosity coatings.

The coating material is preheated in the reservoir. The coated film is routed over a heated drum 22 maintained at about preferably 150° F., to ensure the desired coating viscosity and flow characteristics for the final coated film. These flowable coating characteristics are well known in the art.

At approximately a 90 degree position of the heated drum 22, FIG. 1, the film 10 is exposed to low intensity ultraviolet (UV) irradiation from a first UV lamp source 24. Exposure of the coating to UV irradiation causes energetic photons to initiate radical polymerization of the ethylenic groups. The coating preferably is exposed to a dosage of radiation from a conventional medium pressure mercury vapor lamp having a spectral output over the entire UV range of 200–400 nm. The partially cured coated film 25 can be subsequently processed through a second UV lamp 26 to cure the film to a tack-free state. The partially cured film 28 is then fully cured by a low accelerating energy electron beam to form a low gloss abrasion resistant topcoat.

If the present invention is intended to produce floor covering products, the cured composition should exhibit performance properties sought in a floor covering, such as good stain resistance and gloss retention, as well as sufficient toughness to resist gouging from foot traffic. For the purpose of this invention, floor coverings also must display a degree of flexibility, such that once cured onto the rigid film, the wearlayer can be wound-up onto a small diameter core.

It should also be noted that a coating that exhibits low elongation can result in the formation of "across machine direction fractures" once the composite film is wound. Further, during the lamination of the composite film to the substrate or tile base, the coated film should exhibit sufficient elongation to endure stretching that takes place during this process. Also, the coating on the rigid decorative film should have sufficient elongation to withstand stretching associated with embossing the surface of the film. In the current invention, elongation of the coating at break (74.6° F., 50% RH) should be greater than 10 percent in the machine direction, as recorded on a Model 1135 Instron with a 0.5"×6" sample size at a jaw speed of 1 inch/min with a jaw separation of 2 inches.

The preferred composition for use in this invention is disclosed in U.S. Pat. No. 5,719,227, the subject matter of which is incorporated herein by this reference. Although not limited to polyurethane and polyester floor covering, the following is an example of the preferred resin material:

1) A diisocyanate and/or isocyanurate structure
2) A polyester polyol
3) A polyester comprising a hydroxy and acrylyl functionality The resin material then is mixed with mono, di, or trifunctional acrylates to form the initial composition. The final floor covering composition preferably is prepared by addition of:

1) Flatting agent such as silicon dioxide; and/or
2) Hard particulates such as aluminum oxide; (calcined, crystalline, semi-, micro-, or non-crystalline, amorphous, precipitated, and other types as known in the art), spinel, aluminum phosphate, silica, titanium, diamond, boron nitride, and other hard particulates as known in the art; and one or more additional additives from the group comprised of:
   a. free-radical initiators that cleave upon exposure to UV radiation to form radicals that initiate polymerization of the coating composition, including photoinitiators such as acylphosphine oxides, acetophenone derivatives, and benzophenone type materials;
   b. Surfactants to provide good leveling and flow characteristics of the applied wet coating; and
   c. UV absorbers that help prevent discoloration of coating and/or flooring structure after production and upon exposure to UV radiation in the form of sunlight.

The second step in this process of the present invention is to partially cure the composition and/or bulk of the coating from exposure to low intensity UV radiation so as to not to degrade or yellow the rigid film and alter the appearance of the decorative layer. This process polymerizes the ethylenically unsaturated groups within the resin material from a liquid to a 'gel,' and results in a low gloss wearlayer surface. Low gloss is apparent to the naked eye when light is reflected from a micro roughened surface in a diffuse manner. The micro-roughened surface can be achieved by use of a flatting agent such as silica. Gloss level of the wearlayer on the end floor covering product is controlled by a number of factors, to include: drum temperature, UV peak intensity, irradiation dosage, free radical generator type, and free radical generator level in the composition.

Commercially available medium pressure ultraviolet mercury lamp sources have a strong infrared component that often results in excessive heating of the coating and substrate. This infrared (IR) component can be as much as 60% of the total lamp power. Consequently, curing the resin material on unsupported rigid film by commercially available UV lamps typically results in film distortion due to the temperature of the film exceeding the glass transition temperature. And any distorted film usually cannot ultimately be processed into a satisfactory floor covering.

To greatly lessen this problem, the present inventive method uses heated drum 22 to act as a heat sink for the IR component of the UV lamps 24 and 26, and to maintain film 10 temperature. The heated drum 22 also lowers the viscosity of the coating sufficiently prior to cure in order to allow for formation of the low gloss surface. The low intensity UV exposure preferably does not fully cure the low gloss wearlayer surface.

In the third step of this process, the low gloss wearlayer surface is fully cured by utilizing ionizing radiation in the form of low voltage electrons. This method, often referred to as electron beam (EB) curing, which also is known in the art, is preferably conducted in the presence of a nitrogen-rich or inert atmosphere. Since heat in the form of infrared energy essentially is eliminated by using accelerated electrons, the substrate can be kept below its glass transition temperature and remain free of distortion. However, commercially available electron beam units, such as those from Energy Science Inc., or RPC Industries, typically operate to produce an electron accelerating energy between 150,000 to 300,000 electron volts, which is found to have adverse effects on the curing of the wearlayer of the surface covering product.

The present invention preferably utilizes lower than standard electric voltage to minimize s degradative effects to the vinyl film and substrate. In curing applications where the preferred coating weight is 60 grams per meter square, more than 90 percent of the electrons are penetrating into the substrate at an electron energy of 150,000 electron volts. Such energy, if used in the current invention, however, could still be sufficient to cause degradation of the rigid vinyl film and result in a yellow appearance that alters the decorative appeal. Utilizing low electron beam accelerating energy below 130,000 electron volts has been found to minimize electron penetration into the vinyl film to minimize discoloration of the colored decorative floor covering. This is particularly important for white decorative rigid film where even slight yellowing produces an undesirable effect. While the preferred processes utilize electron accelerating energy of approximately 130,000 electron volts, it is possible to utilize a higher or lower voltage in the process to achieve acceptable results in the surface covering product.

The degree of yellowing can be measured by use of a color/meter that measures tristimulas color values of 'a', 'b', and 'L' where color coordinates are designated as +a (red),–a (green), +b (yellow),–b(blue),+L(white), and –L(Black). More appropriate is to express the degree of yellowing as $\Delta b$ or difference in b values between initial and final values. A $\Delta b$ greater than one (1) generally can be detected by the naked eye. The dose or amount of ionizing radiation is referred to as a 'rad,' where one rad is equal to 100 ergs of energy absorbed from ionizing radiation per gram of material. The more commonly used terminology is a 'Megarad' or $10_6$ rad. The dose required to cure the composition will be dependent on the chemistry of the composition. In the current application, with the preferred composition a dose of 4 to 8 Megarads is sufficient to cure the composition to form a wearlayer.

Figure 2:
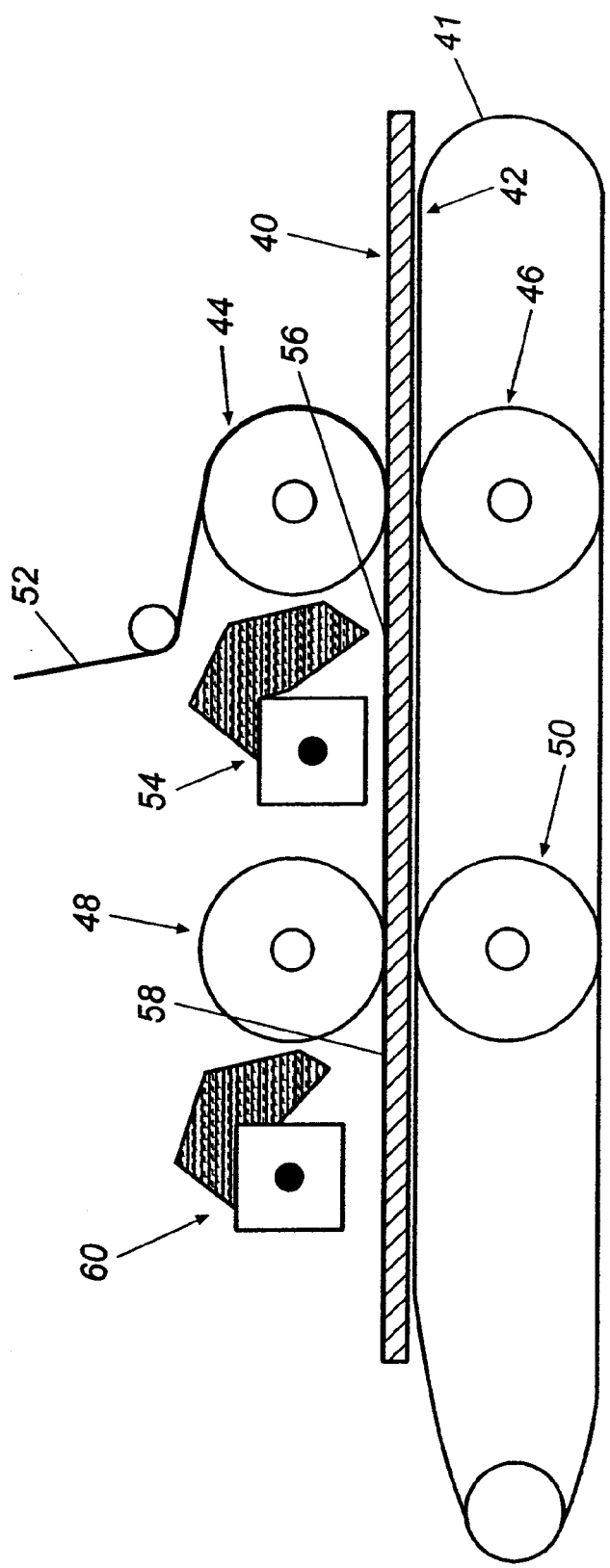
FIG. 2 is a schematic view of a belt-line apparatus for forming a floor covering having a precoated film wearlayer.

The fourth step in the process is preferably the lamination/embossing of the precoated decorative rigid film to the substrate or tile base. The two common methods in the art for forming a floor covering are the utilization of a belt line or a drum line. FIG. 2 illustrates a belt line apparatus for forming floor coverings, and as is known in the art, a vinyl mixture sheet 40 is provided on a conveyor 41 at a temperature of 300° F. to 330° F. The composition of the vinyl mixture preferably is resin material, plasticizer, and filler, which creates a tile base of 42 to 80 mils in thickness. The belt 42 is heated to allow for good adherence of the sheet to the belt, but should not exceed the glass transition temperature of the sheet due to the aforementioned adverse effects. In the embodiment shown in FIG. 2, the vinyl mixture sheet 40 makes contact with two sets of rolls, such as rollers, 44, 46 and 48, 50. Each set of rolls is comprised of two rolls, where the bottom rolls 46 and 50 preferably are backing rolls and the top rolls 44 and 48 preferably are either laminator or embossing rolls.

A coated decorative rigid film 52 is fed around roll 44 with the surface opposite the roll being the noncoated surface. In the nip between rolls 44 and 46, the precoated film and tile sheet are preferably laminated although other forms of adherence as known in the art are alternately used. The heat of the tile sheet raises the temperature of the film above the glass transition temperature in the nip between rolls 44 and 46, which facilitates lamination. At the glass transition temperature, the rigid film essentially is stress free, and thereafter can be embossed, if desired. It should be noted that the single roll can be an embossing roll, thereby allowing lamination and embossing to be carried out as one step.

In instances where the coating crosslinking does not allow movement of the rigid film, differential shrinkage of the coating and rigid film can occur after the laminated film proceeds through the nip. This may result in an undesirable formation of wrinkles oriented in the direction of tension or machine direction. To prevent differential shrinkage, the laminated film base is preferably cooled by pouring water from coolant applicator 54 on the laminated or embossed surface 56 after the film proceeds on the belt 42 away from rolls 44 and 46. This water bath rapidly cools the surface of the film/tile base below 200° F. If this cooling is not accomplished, wrinkle formation can occur beginning from at about a distance of six inches from rolls 44 and 46 at 120 fpm.

A second set of rolls 48, 50 can be used to provide an embossed effect on the rigid film/tile base structure. After passing between rolls 48 and 50, the rigid film/tile base 58 is cooled by pouring water from coolant applicator 60 to lower the temperature below the glass transition temperature of the rigid film/tile base 58. Stresses that developed during processing as a result of heat will consequently be locked in to afford a flat tile structure.

Figure 3:
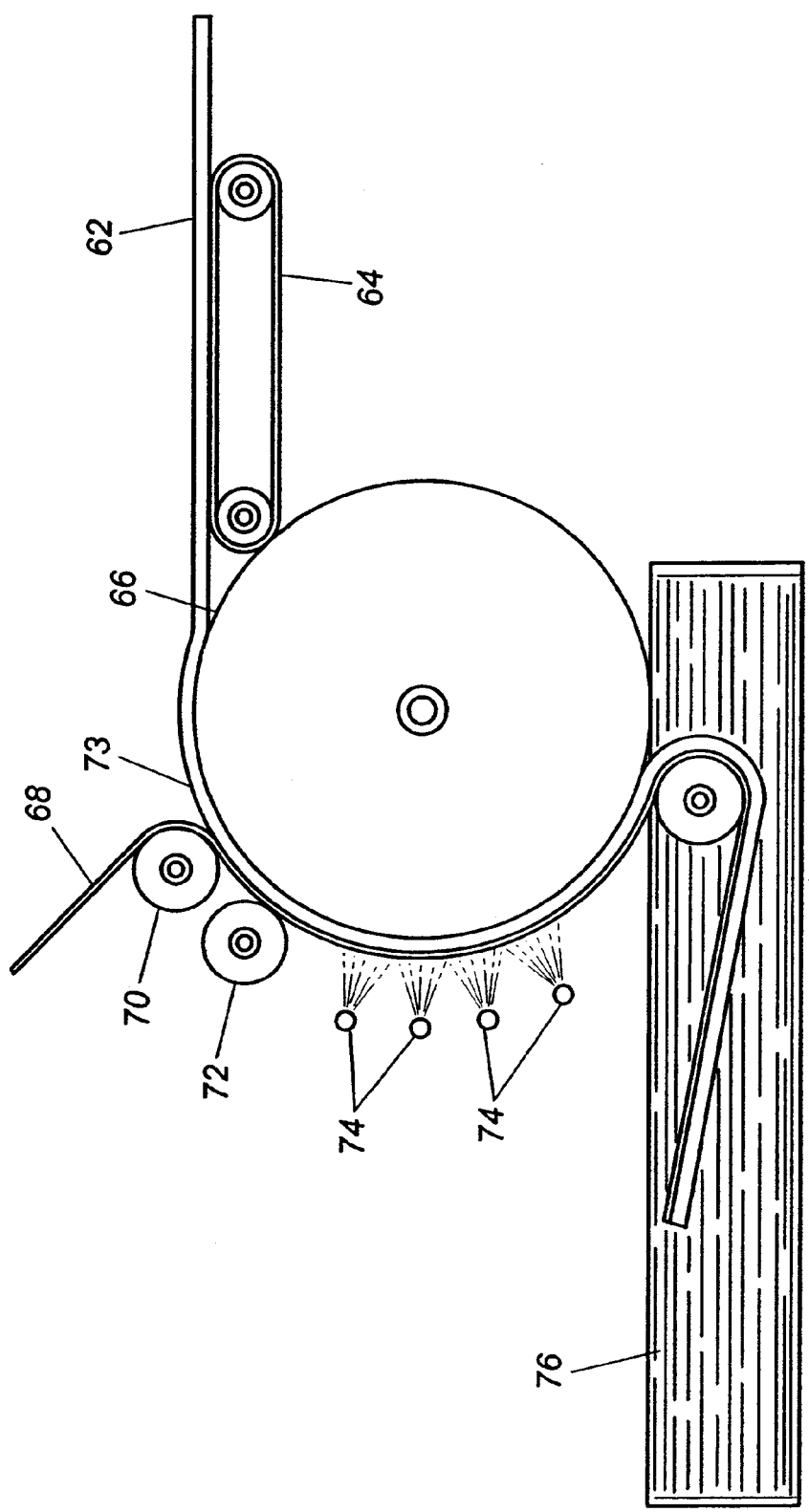
FIG. 3 is a schematic view of a drum-line apparatus for forming a floor covering having a precoated film wearlayer.

Alternatively, floor tile can be processed on a drum line in a manner as shown in FIG. 3, and fully described in U.S. Pat. No. 4,804,429, the disclosure of which is to be incorporated herein by this reference. Such processing is similar to the belt-line manufacturing process. A vinyl mixture sheet 62 of the composite described above, maintained at a temperature of 300° F. to 340° F., is transferred from a conveyor 64 to a drum 66 that is heated to 180° F. to give good adherence of the vinyl mixture. The vinyl mixture sheet 62 is fed through the nip of first set of rolls 70, including a lamination roll 70, the exposed side 73 of the mixture sheet 62 being the coated side. In the nip between the first set of rolls 70, the precoated film 68 and vinyl mixture sheet 62 are laminated. Thereafter, the coated rigid film/vinyl base mixture is fed through a second set of rolls 72, preferably comprising an embossing roll 72 and drum 66, to give the product an embossed texture. The temperature of the precoated film/vinyl mixture is, likewise to the belt-line process, kept above the glass transition temperature of the film and coating during the embossing process. The laminated film base is then cooled by pouring water, shown as emanating from spray nozzles 74 onto the surface while on the drum 66. The laminated film base is fed into a water bath 76, which brings the temperature of the rigid film/tile base below the glass transition temperature of the film, thereby locking the stresses into the tile sheet to preferably maintain flatness of the floor tile.

EXAMPLES OF THE PRESENT INVENTION

An example of an acrylated polyester, Polyester 1, for the coating acceptable for the present invention is a hydroxy terminated polyester (polyester polyol) which was prepared from the following charge in a 12 Liter flask:

| | |
|---|---|
| Trimellitic anhydride | 2259 g |
| 1,6-Hexanediol | 5291 g |
| Phthalic Anhydride | 1406 g |
| p-Toluenesulfonic acid | 1.8 g |

The flask was equipped with a mantle, stirrer, thermometer, temperature controller, gas inlet tube, and an upright condenser. The condenser was steam heated and packed with glass helices and had a thermometer on top. The still led to a water cooled condenser that drained into a graduated cylinder. Water collected during the reaction was collected and measured.

The batch was heated to 220° C. under a trickle of nitrogen (0.5SCFH) gas during which time water of esterification was collected. The reaction mixture was further heated for 5 hr. during which time the vapors in column head had fallen from 98° C. to 65° C. at a nitrogen flow of 1.0SCFH. The reaction mixture was cooled and the total amount of water collected was 643 grams. The final product gave an Acid No. of 2.5 and a Hydroxyl No. of 207. It therefore had a hydroxy equivalent weight of 274 an estimated number average molecular weight of 880.

The prepared polyester was acrylated as follows. The materials below were introduced into a 2000 ml flask equipped with a mantle, stirrer, thermometer, gas inlet tube, dropping funnel, and Barrett Trap with a water cooled condenser on top.

| | |
|---|---|
| Heptane | 100 ml |
| Polyester | 800 g |
| Acrylic Acid | 277 g |
| Monomethyl ether of hydroquinone | 0.1 g |
| P-Toluenesulfonic acid | 5.38 g |
| Phosphorus Acid | 0.6 g |
| Hydroquinone | 0.1 g |
| 2,6,Di-tert-butyl-4-methylphenol | 0.1 g |

The trap was filled to the overflow with heptane. With dry air flow of 0.2SCFH, the ingredients were heated to reflux at 98° C. to 105° C. while stirring vigorously and collecting water and displacing heptane in the trap. Heptane was added through the dropping funnel as required to maintain reflux at about 104° C. After 4 hours of reflux, approximately 65 mL of aqueous distillate had collected. All "water" and heptane were withdrawn from the trap and the dry air flow was increased to 2SCFH. When distillation stopped, additional "heptane" had collected in the trap. The batch was cooled to 50° C. with a trickle of dry air. The Acid Number of the product was 34.

A further example of a hydroxy terminated polyester, Polyester 2, was prepared in an identical fashion to that described for Polyester 1 with the following charge weights:

| | |
|---|---|
| 1,6 Hexanediol | 992.7 g |
| Glycerine | 133.5 g |
| Phthalic Anhydride | 1071 g |
| Dibutyltin Dilaurate | 0.5 g |

The reaction mixture was cooled and total amount of water collected was 135 grams. The final product gave an Acid No. of 2.4 and a Hydroxyl No of 179. It thus had a hydroxyl equivalent weight of 316.

Coating Composition 1

A polyurethane wearlayer forming composition was prepared from the following charge in a 2 Liter flask equipped with heating mantel, stirrer, and dry air purge at 0.25SCFH:

| | |
|---|---|
| Tone M-100, Hydroxyacrylate from Union carbide | 126 g |
| Monomer mixture (27.5% by wt Sartomer SR499, 27.5% by wt Sartomer SR502, 45% by wt Sartomer SR351) | 125 g |
| Polyester 2 | 35 g |

This mixture was heated to 100° F. The following was added:

| | |
|---|---|
| Desmodur N-3300, Bayer's isocyanurate trimer | 87 g |

This mixture was heated to 185° F. (85° C.) and maintained at this temperature for five hours, The mixture was cooled and to the flasks was added:

| | |
|---|---|
| Monomer mixture (27.5% by wt Sartomer SR499, 27.5% by wt Sartomer SR502, 45% by wt Sartomer SR351) | 15 g |
| Surfactant Dow Corning 193 | 1 g |

An infrared spectrum confirmed that all of the NCO groups had reacted. To this mixture was added 48 grams of calcined aluminum oxide (30 microns) and 34 grams of the silica flatting agent Degussa OK412. This mixture was blended using a Cowles type blade. The final mixture was deaerated. Typical Viscosity Profile: (Measured on a Brookfield Thermosel Viscometer Spindle)

| Temperature (F.) | RPM | Viscosity (cps) |
|---|---|---|
| 77 | 0.5 | 78,500 |
| 80 | 0.5 | 68,800 |
| 90 | 0.5 | 46,500 |
| 100 | 1.0 | 28,500 |
| 110 | 1.0 | 21,700 |
| 120 | 2.5 | 12,400 |
| 130 | 5.0 | 8,060 |
| 140 | 5.0 | 6,330 |
| 150 | 5.0 | 5,180 |

Coating Composition 2

A polyster wearlayer forming composition was prepared from:

| | |
|---|---|
| Acrylated Polyester 1 | 750 g |
| Highly ethoxylated triacrylate Sartomer SR9035 | 250 g |
| Benzophenone photoinitiator | 10 g |
| Irgacure 184 photoinitiator from Ciba Geigy | 2.5 g |
| Surfactant Dow Corning 193 | 2.5 g |

To the mixture was added 41 g of surface treated silica. The mixture was blended using a Cowles type blade. Both high gloss and low gloss surface wearlayers can be obtained from the same coating by changing WVA peak intensity. An example of the interaction is shown in Table 1.

EXAMPLE 1

Specifically, Composition 1 was blended with 3% by weight based on resin weight (excluding silica and aluminum oxide) of the photoinitiator benzophenone as the free radical generator. The coating was preheated to 140° F. to reduce the viscosity. Composition 1 was than applied onto a dead two roll coater preheated to 140° F. The rigid film having a decorative layer down is fed into two roll coater as illustrated in FIG. 1. The rigid vinyl film web was routed over a 12.75 inch diameter heated to 155° F. The wrap of the film was about 180 degrees. One UV lamp was mounted at about 90 degrees relative to the 12 o'clock position of the heated drum and a second UV lamp mounted about 180 degrees, as illustrated in FIG. 1. The distance of the bulb to the roll was about 13 inches. At 25 fpm, the peak WVA intensity was varied from 40 mW/cm$^2$ to mW/cm$^2$ for the Aetek lamp mounted in the 90 degrees position (fusion lamp 24). Curing Composition 1 under these various UVA peak intensities resulted in various 60 degree gloss measurements ranging from 22 to 55 for the cured wearlayer surface. A cure sufficient to from the wearlayer was achieved by passing this partially cured coated web through an Energy Science Electro-Curtain electron beam generator operating at 120 KeV. The dosage was 5 Megarads and the level of oxygen within the nitrogen inerted chamber where the coating was cured was kept below 50 parts per million.

TABLE 1

UVA Peak Intensity vs. Gloss

| Peak Intensity mW/cm$^2$ | 60 deg Gloss Measurement |
| --- | --- |
| 41 | 27 |
| 61 | 22 |
| 80 | 25 |
| 140 | 39 |
| 250 | 55 |

EXAMPLES 2 to 5

Table 2 illustrates that varible gloss levels can be achieved by changing the heated drum 22 temperature, as depicted in FIG. 1. Composition 1 processed in an identical fashion to that described in Example 1 expect that the drum temperature was varied from 100° F. to 157° F. At a line speed of 30 fpm, 60 degree gloss level readings below 45 could be achieved at roll temperatures between 130° F. to 157° F. At a roll temperature of 100° F. and a UVA peak intensity of 100 mW/cm$^2$, a high gloss wearlayer is achieved.

TABLE 2

Gloss Data at Various Drum Temperatures (mW/cm$^2$)

|  | Example 2 | Example 3 | Example 4 | Example 5 |
| --- | --- | --- | --- | --- |
| Drum Temperature (deg F.) | 157 | 141 | 130 | 100 |
| Minimum 60 deg Gloss Measurement | 25 | 34 | 42 | 71 |
| Peak Intensity UVA | 100 | 100 | 100 | 100 |

EXAMPLES 6 and 7

Benzophenone photoinitiator (free radical generator) level likewise affects gloss level. The compositions processed in the manner disclosed herein, with the line speed of individual drum temperature runs where the peak intensity was varied to obtain a minimum gloss value, affected the gloss level as follows:

|  | Example 6 | Example 7 |
| --- | --- | --- |
| Wt % Benzophenone in Composition 1 | 1% by wt | 3% by wt |
| Minimum 60 deg Gloss Measurement | 32 | 25 |

EXAMPLES 8 to 10

The free radical generator type used also affects on minimum gloss level, as shown in Table 3. Minimum Gloss is given in Table 3 at 3% by weight of a photoinitiator concentration. Minimum gloss levels are achieved at different peak intensities for each photoinitiator. Compositions described in Table 3 were processed in near identical fashion to those in Example 1. Photoinitiators that generate radicals via hydrogen abstraction such as benzophenone or by Norish I type cleavage such as Irgacure 184(1-hydroxycyclohexyl phenyl ketone) or Irgacure 651(2,2-dimethoxy-2-phenyl acetophenone) are thus particularly useful for this invention.

TABLE 3

| Photoinitiator (3% by wt) | Example 8 Benzophenone | Example 9 Irgacure 184 | Example 10 Irgacure 651 |
| --- | --- | --- | --- |
| Minimum 60 deg Gloss Measurement | 27 | 24 | 26 |
| Peak intensity @ min gloss (mW/cm$^2$) | 100 | 22 | 22 |
| 60 deg Gloss @ peak intensity = 100 | 27 | 40 | 41 |
| 60 deg Gloss @ peak intensity = 22 | 45 | 24 | 26 |

EXAMPLE 11

Addionally, Composition 2 was blended with 4% by weight of the flatting agent Degussa OK412 and processed in a similar fashion to Example 1, except that the line speed was 10 fpm. Minimum gloss level was achieved at an intensity of 74 mW/cm$^2$.

TABLE 4

UVA Peak Intensity vs. Gloss

| Peak Intensity mW/cm$^2$ | 60 deg Gloss Measurement |
| --- | --- |
| 74 | 16 |
| 108 | 23 |
| 126 | 31 |
| 143 | 47 |
| 160 | 50 |

EXAMPLE 12

A typical problem in the prior art system, which is particularly shown in the Matthews patent is that the intensity below the minimum gloss/intensity value for the process, which is not optimal for a production processing standpoint. For optimal production purposes, Coating Composition 1 was processed in an identical fashion to that described in Example 1 to yeild a gloss control shown below.

Varible gloss of the present invention can be achieved on both sides of the intensity/gloss level minimum. This example is graphically depicted below in Graph 1 where the intensity is varied from about 20 mW/cm$^2$ to about 90 mW/cm$^2$. Minimum gloss level is achieved in the processed regime about 40-50 mW/cm$^2$. At 20 mW/cm$^2$ the 60 deg gloss measurementis high, about 60 degrees, and is reduced with increasing intensity, about 40 mW/cm$^2$. And incresing the intensity above about 50 mW/cm$^2$ results in an increase in gloss.

Accordingly, the various measurements were taken, as shown in Table 5, which exemplifies the control curve.

TABLE 5

UVA Peak Intensity vs. Gloss

| Peak Intensity (mW/cm$^2$) | 60 deg Gloss Measurement |
| --- | --- |
| 91 | 46.1 |
| 74 | 36.9 |
| 56 | 22 |
| 39 | 21.6 |
| 21 | 60.1 |

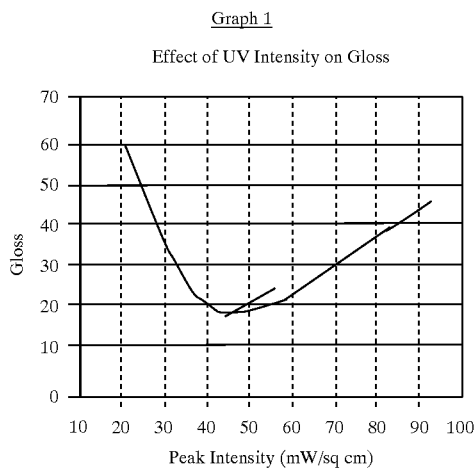

Graph 1
Effect of UV Intensity on Gloss

While there has been shown the preferred and alternate embodiments of the present invention, it is to be understood that certain changes may be made in the forms and arrangement of the elements and steps without departing from the underlying spirit and scope of the invention as set forth in the Claims.

What is claimed is:

1. A method of providing a gloss controlled wearlayer on a substrate, comprising the steps of:

coating a radiation curable composition comprising a flatting agent onto a substrate;

exposing the composition to ultraviolet radiation; and selectively increasing gloss level in the cured composition by selectively increasing the peak intensity of the ultraviolet radiation.

2. The method of claim 1, wherein the step of increasing the peak intensity of the ultraviolet radiation is increasing the peak intensity in excess of about 45 mW/cm$^2$ of surface area.

3. A method of providing a gloss controlled wearlayer on a substrate, comprising the steps of:

coating a radiation curable composition comprising a flatting agent onto a substrate; and exposing the composition to ultraviolet radiation;

wherein the peak intensity of the ultraviolet radiation is selected from peak intensities in which an increase in peak intensity yields a higher gloss.

4. The method of claim 3, wherein the peak intensity of the ultraviolet radiation is in excess of about 45 mW/cm$^2$ of surface area.

5. The method of claim 1, wherein the radiation curable composition comprises non-flatting agent hard particulates.

6. The method of claim 3, wherein the radiation curable composition comprises non-flatting agent hard particulates.

7. A method of providing a gloss controlled wearlayer on a substrate, comprising the steps of:

coating a radiation curable composition onto a substrate; and exposing the composition to ultraviolet radiation;

wherein the peak intensity of the ultraviolet radiation is selected from peak intensities in which an increase in peak intensity yields a higher gloss.

* * * * *